(12) United States Patent
Kato et al.

(10) Patent No.: US 7,586,536 B2
(45) Date of Patent: Sep. 8, 2009

(54) IMAGE SENSOR UNIT AND IMAGE TAKING APPARATUS

(75) Inventors: Takashi Kato, Minami-Ashigara (JP); Tomonori Masuda, Asaka (JP); Hitoshi Miyano, Saitama (JP)

(73) Assignee: Fujifilm Corporation, Tokyo (JP)

( * ) Notice: Subject to any disclaimer, the term of this patent is extended or adjusted under 35 U.S.C. 154(b) by 621 days.

(21) Appl. No.: 11/216,085

(22) Filed: Sep. 1, 2005

(65) Prior Publication Data

US 2006/0044458 A1 Mar. 2, 2006

(30) Foreign Application Priority Data

Sep. 2, 2004 (JP) .............................. 2004-255740

(51) Int. Cl.
*H04N 5/225* (2006.01)

(52) U.S. Cl. ...................................... 348/360; 348/342

(58) Field of Classification Search ................. 348/342, 348/360, 362, 367, 224.1
See application file for complete search history.

(56) References Cited

U.S. PATENT DOCUMENTS 6,952,233 B2 * 10/2005 Nagano ...................... 348/362
2002/0012052 A1 * 1/2002 Nagano ...................... 348/228
2002/0012062 A1 * 1/2002 Fushimi et al. .............. 348/342
2002/0030755 A1 * 3/2002 Uchino ........................ 348/342
2005/0012845 A1 * 1/2005 Kouno ......................... 348/342

FOREIGN PATENT DOCUMENTS

| JP | 10-191181 A | 7/1998 |
|---|---|---|
| JP | 2002-38031 A | 2/2002 |
| JP | 2002-214666 A | 7/2002 |

* cited by examiner

*Primary Examiner*—Nhan T Tran
*Assistant Examiner*—Amy Hsu
(74) *Attorney, Agent, or Firm*—Birch, Stewart, Kolasch & Birch, LLP (57) ABSTRACT

The present invention relates to an image sensor unit including an image sensor that generates an image signal and a filter, and to an image taking apparatus that receives light from a subject and generates an image signal. The image sensor unit and the image taking apparatus achieve excellent photographing through day and night. They are provided with a filter including a transparent layer that is transparent to light in a visible light region regardless of the state of an electric field and is transparent to light in a predetermined variable transparent region containing an infrared light region and/or an ultraviolet light region in response to the state of the electric field, and electrodes that generate the electric field in the transparent layer on the application of a voltage.

10 Claims, 11 Drawing Sheets

IMAGE SENSOR UNIT AND IMAGE TAKING APPARATUS

BACKGROUND OF THE INVENTION

1. Field of the Invention

The present invention relates to an image sensor unit including an image sensor for generating an image signal and a filter, and to an image taking apparatus for generating an image signal from a received light from a subject.

2. Description of the Related Art

An image taking apparatus for taking pictures for 24 hours, such as a surveillance camera, has been known. The brightness of a subject to be photographed greatly varies between daytime and nighttime, in particular, in the outdoors. Thus, it is difficult to compensate such a large variation in the brightness by exposure control with a diaphragm used in a conventional camera.

One countermeasure is to use a neutral-density filter and a highly sensitive image sensor. In the daytime, pictures are taken while the neutral-density filter reduces the brightness. In the nighttime, pictures are taken using direct light from a subject while the neutral-density filter is removed to increase relative sensitivity in night photography.

However, the use of such a neutral-density filter requires a mechanism for putting in and taking out the neutral-density filter, resulting in a larger image taking apparatus or an increase in cost.

Another countermeasure is to use a filter that can regulate the amount of transmitted light by the application of a voltage and an image sensor that utilizes such a filter to regulate the light exposure (for example, Japanese Unexamined Patent Application Publication Nos. 10-191181 and 2002-214666). Such a filter may be used in combination with another light control means to decrease the difference in the amount of light between day and night.

However, since the subject is particularly dark in the night photography, only decreasing the difference in the amount of light using such a filter will result in insufficient sensitivity. Thus, some countermeasure that can increase the sensitivity in the night photography and achieve excellent photographing through day and night is desired.

SUMMARY OF THE INVENTION

The present invention has been made in view of the above circumstances and provides an image sensor unit and an image taking apparatus that can achieve excellent photographing through day and night.

According to the present invention, an image sensor unit includes an image sensor that receives light from a subject and generates an image signal, and a filter that is disposed in front of the image sensor, wherein the filter includes a transparent layer that is transparent to light in a visible light region regardless of the state of an electric field and is transparent to light in a predetermined variable transparent region containing at least one of an infrared light region and an ultraviolet light region in response to the state of the electric field, and electrodes that generate the electric field in the transparent layer on the application of a voltage.

In the image sensor unit according to the present invention, since the amount of transmitted light may vary in the variable transparent region, for example, normal photographing is performed while the light in the variable transparent region is blocked in the daytime, and in the nighttime the light in the variable transparent region is transmitted for dark-field photography. Thus, excellent photographing can be achieved day and night. Furthermore, in the image sensor unit according to the present invention, since the amount of transmitted light in the variable transparent region varies on the application of a voltage, it is possible to downsize the unit and reduce the cost.

Preferably, the transparent layer is composed of a dispersion medium that is transparent to the light in both the visible light region and the variable transparent region, and dispersoids that are dispersed in the dispersion medium. The dispersoids are impermeable to the light in the variable transparent region and are transparent to the light in the visible light region.

In such a transparent layer, when the dispersoids migrate in the dispersion medium by electrophoresis, the light transmittance in the variable transparent region varies. A variety of dispersion media or dispersoids can be used to achieve the electrophoresis. Thus, a combination of a dispersion medium and dispersoids that provides desired transmittance can be easily obtained.

Nanoparticles containing infrared absorbing material are preferred as the dispersoids, because they efficiently absorb the light in the infrared light region. Polymer particles containing the infrared absorbing material are preferred as the dispersoids, because they are excellent in compatibility.

An organic dispersion medium is preferred as the dispersion medium because of its electrical stability. A hydrocarbon-based organic dispersion medium is more preferred as the dispersion medium, because this medium is electrically more stable.

In the image sensor unit according to the present invention, the transparent layer may be a liquid crystal layer in which the orientation of liquid crystal molecules varies in response to the state of the electric field. The liquid crystal layer changes between an off-state and an on-state depending on the orientation of the liquid crystal molecules. In the off-state, the light in the visible light region and the variable transparent region passes through the liquid crystal layer. In the on-state, only the light in the variable transparent region is absorbed or reflected and the light in the visible light region passes through the liquid crystal layer.

Preferably, the transparent layer composed of such a liquid crystal is a holographic liquid crystal layer.

The holographic liquid crystal layer is a composite of a nematic liquid crystal and a polymer. The composite has a refractive-index distribution in which the refractive index varies at regular intervals, and selectively reflects the light in the variable transparent region. Thus, it is easy to remove the light in one particular wavelength region by the selective reflection, and pass the light in the other wavelength regions. This holographic liquid crystal layer provides an optical filter having a distinct boundary between the reflective wavelength region and the transparent wavelength region.

Preferably, the transparent layer composed of the liquid crystal layer is a cholesteric liquid crystal layer.

The cholesteric liquid crystal layer has a "memory"; it requires the application of a voltage only when the optical transparency is changed, and the optical transparency can be maintained without the application of the voltage. This reduces the power requirements.

According to the present invention, an image taking apparatus that receives light from a subject and generates an image signal having:

(A) an image sensor unit including:
(a) an image sensor that receives the light from the subject and generates the image signal, and (b) a filter that is disposed in front of the image sensor, having:
- (b-1) a transparent layer that is transparent to light in a visible light region regardless of the state of an electric field and is transparent to light in a predetermined variable transparent region containing an infrared light region and/or an ultraviolet light region in response to the state of the electric field, and
- (b-2) electrodes that generate the electric field in the transparent layer on the application of a voltage; and (B) a filter controller that regulates the wavelength region of light passing through the filter by controlling the voltage applied to the electrodes.

In the image taking apparatus according to the present invention, as in the image sensor unit according to the present invention, since the amount of transmitted light in the variable transparent region varies, excellent photographing can be achieved day and night. Furthermore, in the image taking apparatus according to the present invention, since the amount of transmitted light in the variable transparent region varies on the application of a voltage, it is possible to downsize the unit and reduce the cost.

Preferably, the image taking apparatus according to the present invention includes
a sensor that determines the brightness of a subject,
wherein the filter controller applies a voltage depending on the measurement obtained with the sensor.

In such a preferred image taking apparatus, for example, during long-time automatic photographing with a surveillance camera, the amount of transmitted light in the variable transparent region can be automatically changed. Thus, excellent automatic photographing can be achieved day and night.

The image taking apparatus according to the present invention includes various aspects that correspond to those described for the image sensor unit according to the present invention.

The image sensor unit and the image taking apparatus according to the present invention permit excellent photographing day and night.

DETAILED DESCRIPTION OF THE INVENTION

First Embodiment

An image sensor unit according to a first embodiment of the present invention will be described below.

Figure 1:
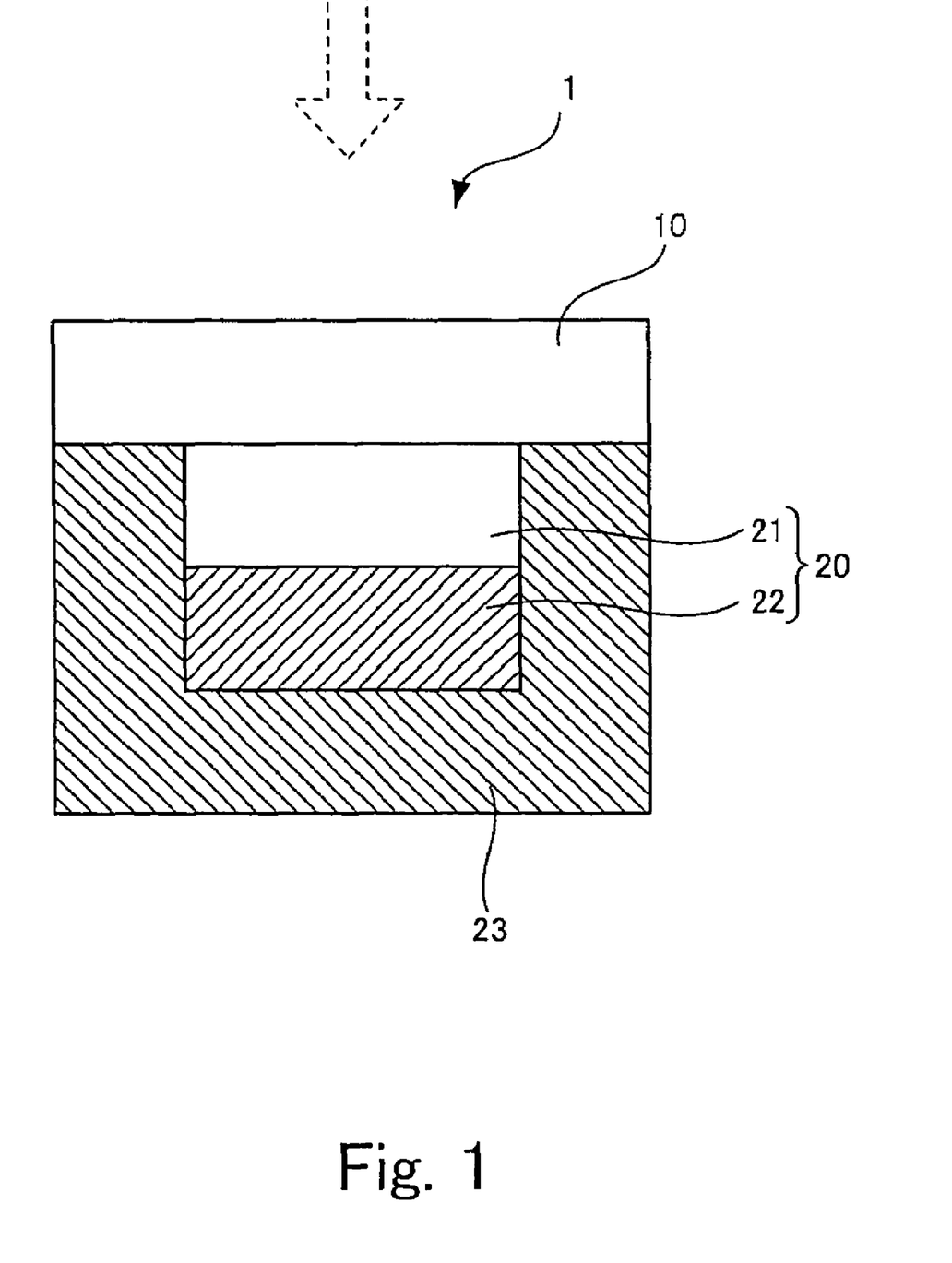
FIG. 1 is a schematic cross-sectional view of an image sensor unit according to an embodiment of the present invention.

FIG. 1 is a schematic cross-sectional view of an image sensor unit 1 according to the embodiment of the present invention.

In the image sensor unit 1 according to the present embodiment, light from a subject represented by a dotted line is converged via an optical filter 10 onto a CCD 20, which is a solid-state image sensor, and is disposed at the back of the optical filter 10, and is converted into an electric signal. The CCD 20 includes a microlens layer 21 for condensing the light from the subject for each pixel corresponding to each photodiode and a photodiode layer 22 of a photodiode array for converting the converged light into an electric signal. The microlens layer 21 and the photodiode layer 22 are held in a supporting layer 23.

The structure of the optical filter 10 will be described below.

In the optical filter 10 according to this embodiment, the amount of transmitted light is regulated by controlling the electrophoresis of nanoparticles 12.

Figure 2:
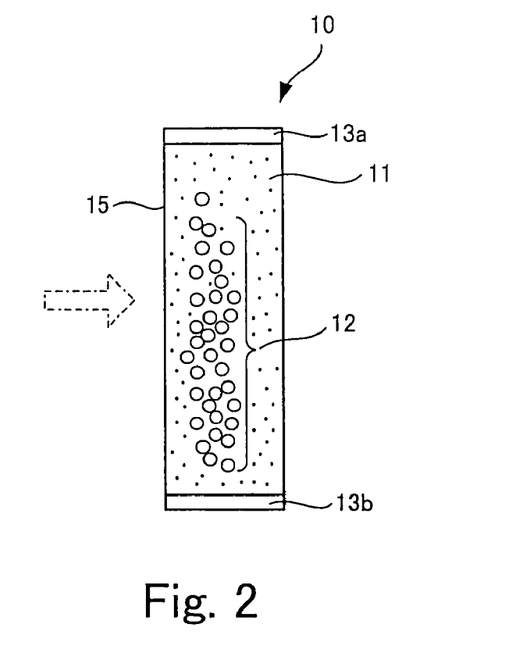
FIG. 2 is a schematic cross-sectional side view of an optical filter.

FIG. 2 is a schematic cross-sectional side view of the optical filter 10.

The optical filter 10 shown in FIG. 1 is composed of a dispersion medium 11, nanoparticles 12 dispersed in the dispersion medium 11, a transparent glass container 15 including the dispersion medium 11 and the nanoparticles 12, a positive electrode 13a at the top end, and a negative electrode 13b at the bottom end of the container 15.

In the present embodiment, the dispersion medium 11 is Isopar (brand name, Exxon Mobil Corporation.), which is a hydrocarbon-based organic solvent, and the nanoparticles 12 are polymer particles containing infrared absorbing material.

The following is a procedure for preparing the nanoparticles 12. First, a solution mixture of 10 g of methyl methacrylate, 0.2 g of aminium near-infrared dye PDR-8 (trade name, Teikoku Chemical Industries Co., Ltd.), 0.4 g of Hexadecane, 1 g of alkylsalicylic acid as an electrifying agent, and a polymerization initiator V-65 (trade name, Wako Pure Chemical Industries, Ltd.) is added dropwise to aqueous sodium dodecyl sulfate. Then, the solution is stirred and is emulsified. The resulting dispersion liquid is heated to 70° C. to initiate polymerization. Thus, polymer nanoparticles containing the near-infrared dye are prepared.

Figure 3:
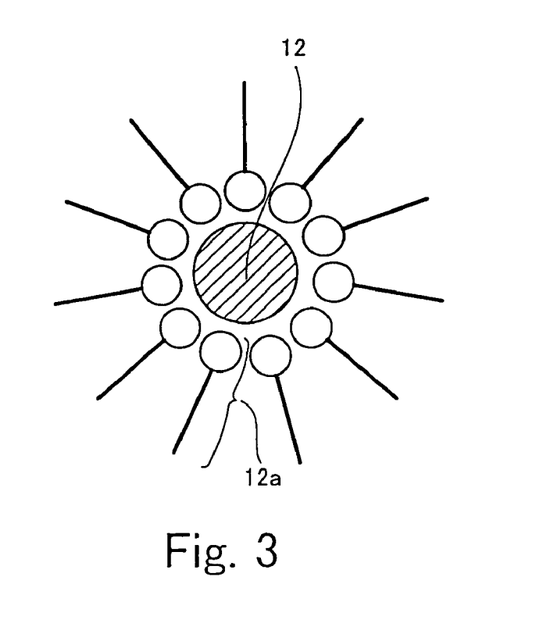
FIG. 3 is a schematic diagram of a nanoparticle and surfactant molecules adsorbed on the nanoparticle.

The nanoparticles 12 have surfactant molecules adsorbed on the surfaces.

FIG. 3 is a schematic diagram of the nanoparticle 12 and the surfactant molecules 12a adsorbed on the nanoparticle 12.

As shown in FIG. 3, the surfactant molecules 12a are adsorbed on the central nanoparticle 12. Without the surfactant molecules 12a, the nanoparticles 12 may aggregate into a larger particle. Such a large particle hardly migrates in the electrophoresis, thus deteriorating the performance of the optical filter. Accordingly, the surfactant molecules 12a adsorbed on the surfaces of the nanoparticles 12 prevent the nanoparticles 12 from aggregating. In the present embodiment, the surfactant molecules 12a are polyacrylamide molecules.

The nanoparticles 12 in the present embodiment are positively charged. Thus, when a voltage is applied between the positive electrode 13a and the negative electrode 13b shown in FIG. 2 to form an electric field, the nanoparticles 12 migrates toward the negative electrode 13b. The positive electrode 13a and the negative electrode 13b are coated with insulating polyimide films, which prevent the nanoparticles 12 from adsorbing on the surfaces of the electrodes. When no electric field occurs as shown in FIG. 2, the nanoparticles 12 are widely distributed in the container 15. As indicated by an alternate long and short dashed line in FIG. 2, when light enters the center of the optical filter 10, an infrared light component of the incident light is absorbed by the nanoparticles 12 at the center of the optical filter 10 and a visible light component of the incident light passes through the optical filter 10. When 20% by mass of nanoparticles 12 are uniformly dispersed in the dispersion medium 11 having a thickness of 2 mm, the light transmittance at 900 nm is 14%.

Figure 4:
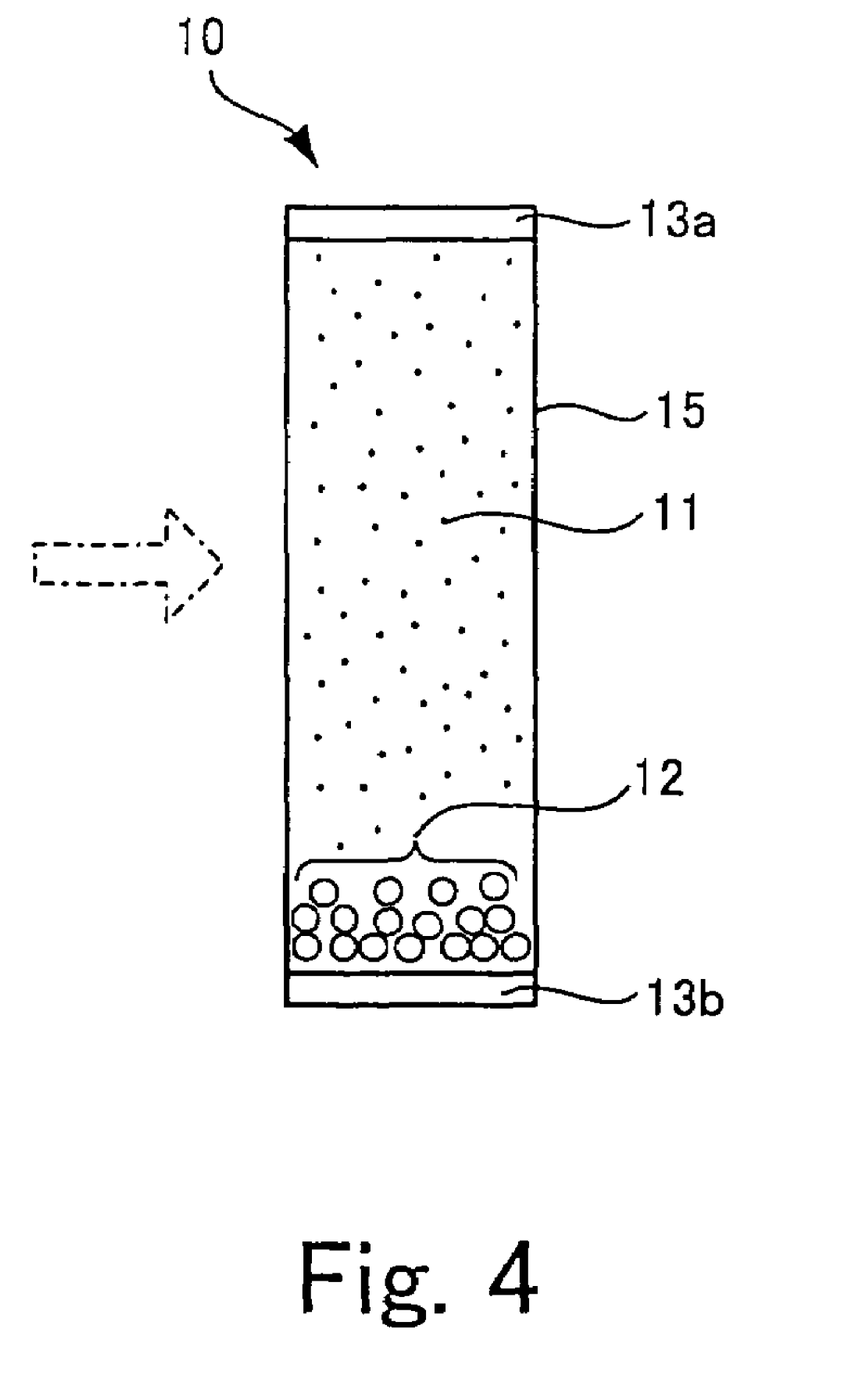
FIG. 4 is a schematic cross-sectional view illustrating the distribution of the nanoparticles when an electric field is applied to the optical filter shown in FIG. 2.

FIG. 4 is a schematic cross-sectional view illustrating the distribution of the nanoparticles when an electric field is applied to the optical filter 10 shown in FIG. 2.

When the electric field is applied between the positive electrode 13a at the top end and the negative electrode 13b at the bottom end of the container 15, most of the positively charged nanoparticles 12 migrate toward the negative electrode 13b, as shown in FIG. 4. As a result, the density of the nanoparticles 12 at the center of the container 15 decreases, as compared with that in FIG. 2. Thus, when light enters the optical filter 10, as indicated by an alternate long and short dashed line, the optical filter 10 is transparent to both infrared and visible light. When the dispersion medium 11 has a thickness of 2 mm, the light transmittance at 900 nm is 90%.

In this way, in the image sensor unit according to the present embodiment, the amount of transmitted light in the infrared light region can be varied. Thus, when photographing is performed day and night, pictures are taken using the visible light in the daytime and using both the infrared light and the visible light in the nighttime. This increases the sensitivity in the nighttime relative to in the daytime, permitting excellent photographing through day and night.

Second Embodiment

Another embodiment of the image taking apparatus according to the present invention will be described below. This embodiment provides a digital camera including the optical filter 10 described in the first embodiment.

Figure 5:
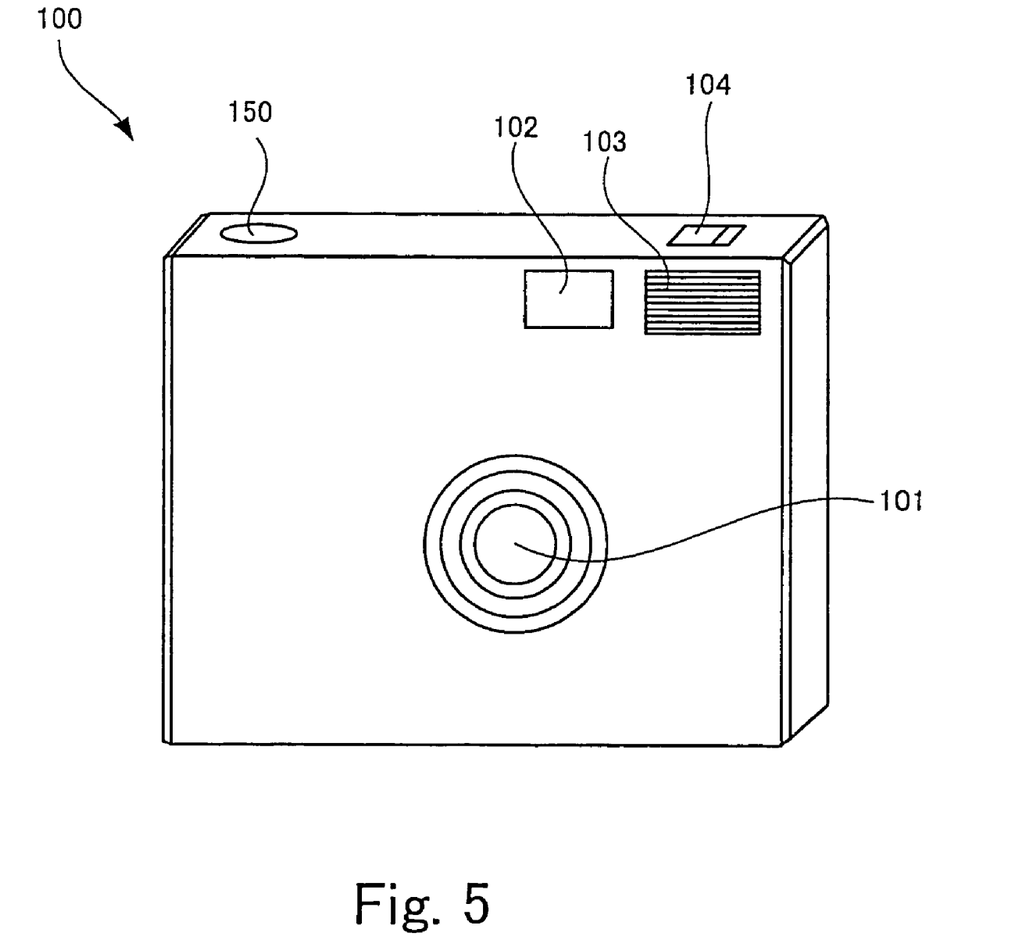
FIG. 5 is an external perspective front view of a digital camera as an embodiment of the image taking apparatus according to the present invention.

FIG. 5 is an external perspective front view of a digital camera 100 as the embodiment of the image taking apparatus according to the present invention.

As shown in FIG. 5, the digital camera 100 is provided with a taking lens 101 in the front center, and an optical viewfinder object window 102 and a fill light emitting section 103 in the top front. The digital camera 100 is also provided with a power slide switch 104 and a release switch 150 on the top.

Figure 6:
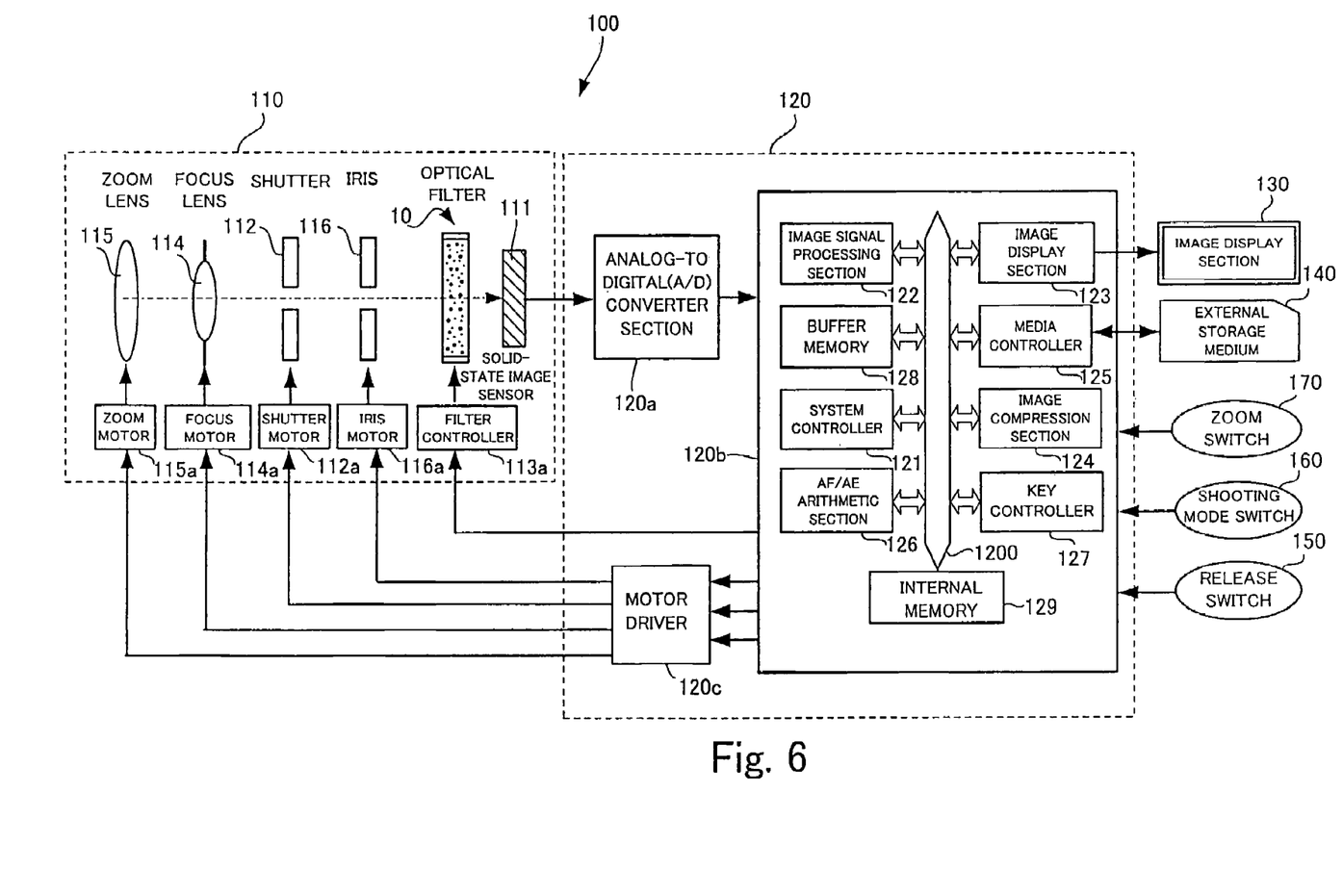
FIG. 6 is a schematic configuration diagram of the digital camera shown in FIG. 5.

FIG. 6 is a schematic configuration diagram of the digital camera 100 shown in FIG. 5.

As shown in FIG. 6, the digital camera 100 according to the present embodiment is roughly divided into a photographic optical system 110 and a signal processing section 120. In addition to these, the digital camera 100 is provided with an image display section 130 for displaying a photographed image and an external storage medium 140 for storing the photographed image signal. The digital camera 100 is also provided with a zoom switch 170, a shooting mode switch 160, and a release switch 150, all of which send processing commands to the digital camera 100.

The configuration of the photographic optical system 110 will be described below with reference to FIG. 6. In the digital camera 100 according to the present embodiment, light from a subject on the left in FIG. 6 passes through a zoom lens 115, a focus lens 114, and an iris 116, which regulates the amount of the light from the subject. When a shutter 112 is open, the light from the subject passes through the optical filter 10 and forms an image on a solid-state image sensor 111. Basically, a photographic optical system includes multiple lenses, at least one of which is greatly involved in focusing, and the relative position of the multiple lenses is related to the focal length. In FIG. 6, the lens for adjusting the focal length is schematically represented by the zoom lens 115, and the lens for focusing is schematically represented by the focus lens 114. The zoom lens 115 and the focus lens 114 can move in response to signals from the signal processing section 120. The zoom lens 115 and the focus lens 114 are put in respective positions in response to the signals from the signal processing section 120. The zoom lens 115, the focus lens 114, the iris 116, and the shutter 112 are driven by a zoom motor 115a, a focus motor 114a, an iris motor 116a, and a shutter motor 112a, respectively. The instructions to operate the zoom motor 115a, the focus motor 114a, the iris motor 116a, and the shutter motor 112a are given by a digital signal processing section 120b in the signal processing section 120 through a motor driver 120c.

The focus lens 114 moves back and forth in the direction of the optical axis when a function of "through the lens auto focus" (TTLAF) of the digital camera 100 according to the present embodiment is actuated. In this TTLAF function, the focus of the focus lens 114 is adjusted. In the TTLAF function, variations in the field contrast when the focus lens 114 is moved between the points corresponding to a maximum lens-to-subject distance and a minimum lens-to-subject distance are detected by an AF/AE arithmetic section 126 in the signal processing section 120 described below, and the position of the focus lens 114 is adjusted such that the contrast reaches its peak. The zoom lens 115 moves in the direction of the optical axis to determine the magnification.

The iris 116 is driven according to an instruction given by the AF/AE arithmetic section 126 in the digital signal processing section 120b to regulate the amount of the light from the subject.

The optical filter 10 is controlled between the state shown in FIG. 2 and the state shown in FIG. 4 by the filter controller 113a according to an instruction from the digital signal processing section 120b. Using the shooting mode switch 160, a daytime shooting mode or a nighttime shooting mode is selected. When the daytime shooting mode is selected, the optical filter 10 assumes the state shown in FIG. 2. When the nighttime shooting mode is selected, the optical filter 10 assumes the state shown in FIG. 4. The same explanation of the structure of the optical filter 10 will be avoided here. While the camera shown in FIG. 6 is provided with only one optical filter 10, the image taking apparatus according to the present invention may be provided with two or more optical filters, and the amount of light may be adjusted in multiple steps.

The above is a configurational outline of the photographic optical system 110.

Next, the configuration of the signal processing section 120 will be described. The subject image formed on the solid-state image sensor 111 in the photographic optical system is read as an image signal by an analog-to-digital (A/D) converter section 120a, which converts an analog signal into a digital signal. The digital signal is sent to the digital signal processing section 120b provided with a system controller 121. The digital signal is processed in the digital signal processing section 120b according to operational procedures instructed by a program built in the system controller 121. Data are delivered between the system controller 121 and an image signal processing section 122, an image display control section 123, an image compression section 124, a media controller 125, the AF/AE arithmetic section 126, a key controller 127, a buffer memory 128, and an internal memory 129 through a bus 1200. The internal memory 129 serves as a buffer during the data delivery through the bus 1200. Variables generated during processing in each section are written into the internal memory 129. The system controller 121, the image signal processing section 122, the image display control section 123, the image compression section 124, the media controller 125, the AF/AE arithmetic section 126, and the key controller 127 can perform appropriate processing with reference to the data. Instructions from the system controller 121 are sent through the bus 1200 to each section to start up processes in each section. The data in the internal memory 129 are rewritten with the progress of the processes. The system controller 121 refers to the data and controls operations in each section. In other words, when the power is turned on, the processes in each section are started up according to programmed steps in the system controller 121. For example, when the release switch 150, the zoom switch 170, or the shooting mode switch 160 is operated, the information of the operation is sent through the key controller 127 to the system controller 121. Then, a process in response to the operation is performed according to the programmed steps in the system controller 121.

When the release switch 150 is turned on, an analog signal of image data read from the solid-state image sensor 111 is converted into a digital signal in the analog-to-digital converter (A/D) section 120a. The digitized image data are temporarily stored in the buffer memory 128 in the digital signal processing section 120b. An RGB signal of the digitized image data is converted into a YC signal in the image signal processing section 122 and is compressed into an image file in a JPEG format in the image compression section 124. The image file is stored in the external storage medium 140 through the media controller 125. The image data stored as the image file can be reproduced through the image display control section 123 on the image display section 130. During these processes, the AF/AE arithmetic section 126 performs arithmetic computations for focusing and exposure on the basis of the RGB signal. The AF/AE arithmetic section 126 determines the contrast from the RGB signal for each lens-to-subject distance to adjust the focus of the focus lens 114. From these measurements, the position of the focus lens 114 is adjusted to a point of focus by a driving mechanism of the focus lens 114. The AF/AE arithmetic section 126 extracts a luminance signal from the RGB signal and detects the subject brightness from the luminance signal. On the basis of the subject brightness, the amount of the light from the subject onto the solid-state image sensor 111 is adjusted by controlling the exposure with the iris 116 through the iris motor 116a.

In the digital camera 100, the amount of the transmitted light in the infrared light region in the optical filter 10 can be varied in response to the shooting mode. Thus, excellent photographing is achieved day and night. In addition, since the amount of the transmitted light in the optical filter 10 can be electrically adjusted, a mechanism for moving the filter and a space for the filter are not required. Furthermore, the optical filter 10 reduces the displacement of the position where the image is formed, associated with variation in the wavelength region of the light from the subject, as described below.

Figure 7:
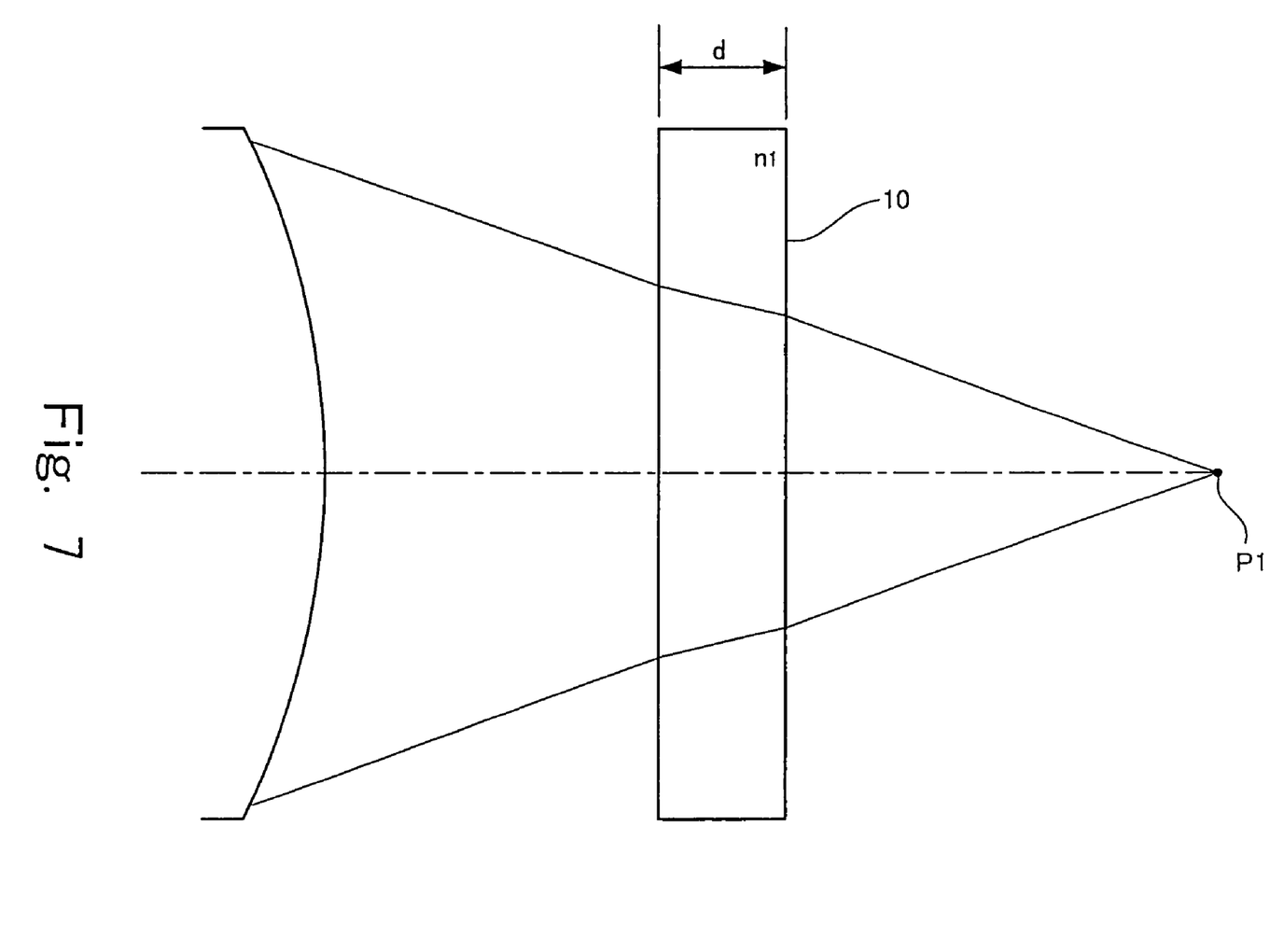
FIG. 7 shows a focal position in photographing using infrared light.
Figure 8:
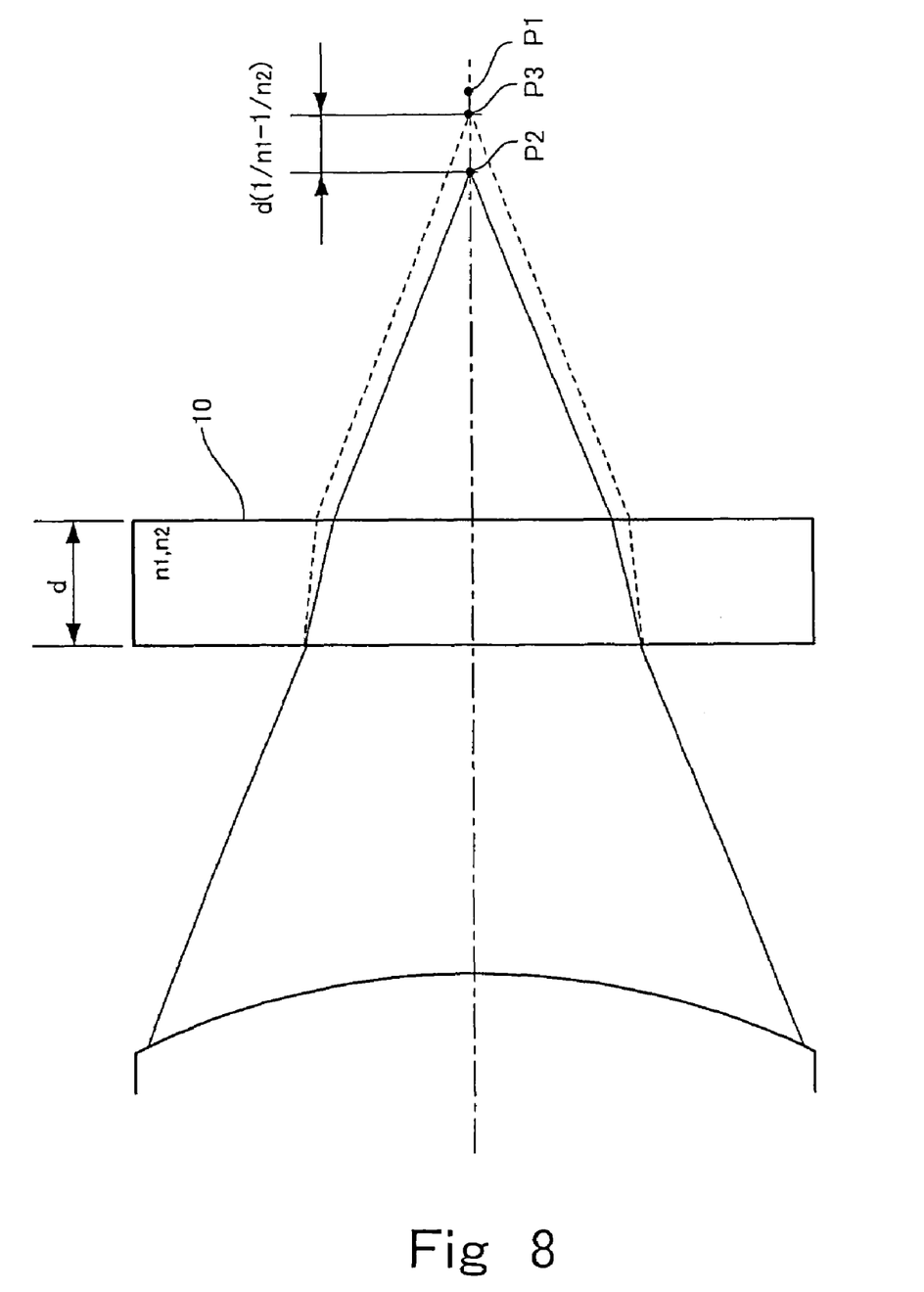
FIG. 8 shows a focal position in photographing using visible light.

FIG. 7 shows a focal position in the photographing using the infrared light, and FIG. 8 shows a focal position in the photographing using the visible light.

In the photographing using the infrared light, since the optical filter 10 assumes the state shown in FIG. 4, the substantial refractive index of the optical filter 10 is the same as a refractive index n1 of the Isopar. The infrared light passing through the optical filter 10 having a thickness of d forms an image at the position of P1. When a picture is taken using the visible light while the refractive index of the optical filter 10 remains at n1, the position where the image is formed moves to P2, as indicated by a solid line in FIG. 8. However, in the digital camera according to the second embodiment, when a picture is taken using the visible light, the optical filter 10 assumes the state shown in FIG. 2. Thus, the optical filter 10 has a higher refractive index n2 than the refractive index n1 of the Isopar because of the higher refractive index of the nanoparticles. As a result, the position where the image is formed moves from P2 to P3 by the amount of $d(1/n1-1/n2)$ as indicated by a dotted line in FIG. 8, approaching the focal position P1 in the photographing using the infrared light.

Thus, in the present embodiment, the variation in the refractive index of the optical filter 10 reduces the displacement of the position where the image is formed, associated with the variation in the wavelength region of the light from the subject.

Third Embodiment

Another embodiment of the image taking apparatus according to the present invention will be described as a third embodiment. This embodiment is a surveillance camera including the optical filter 10 according to the first embodiment.

Figure 9:
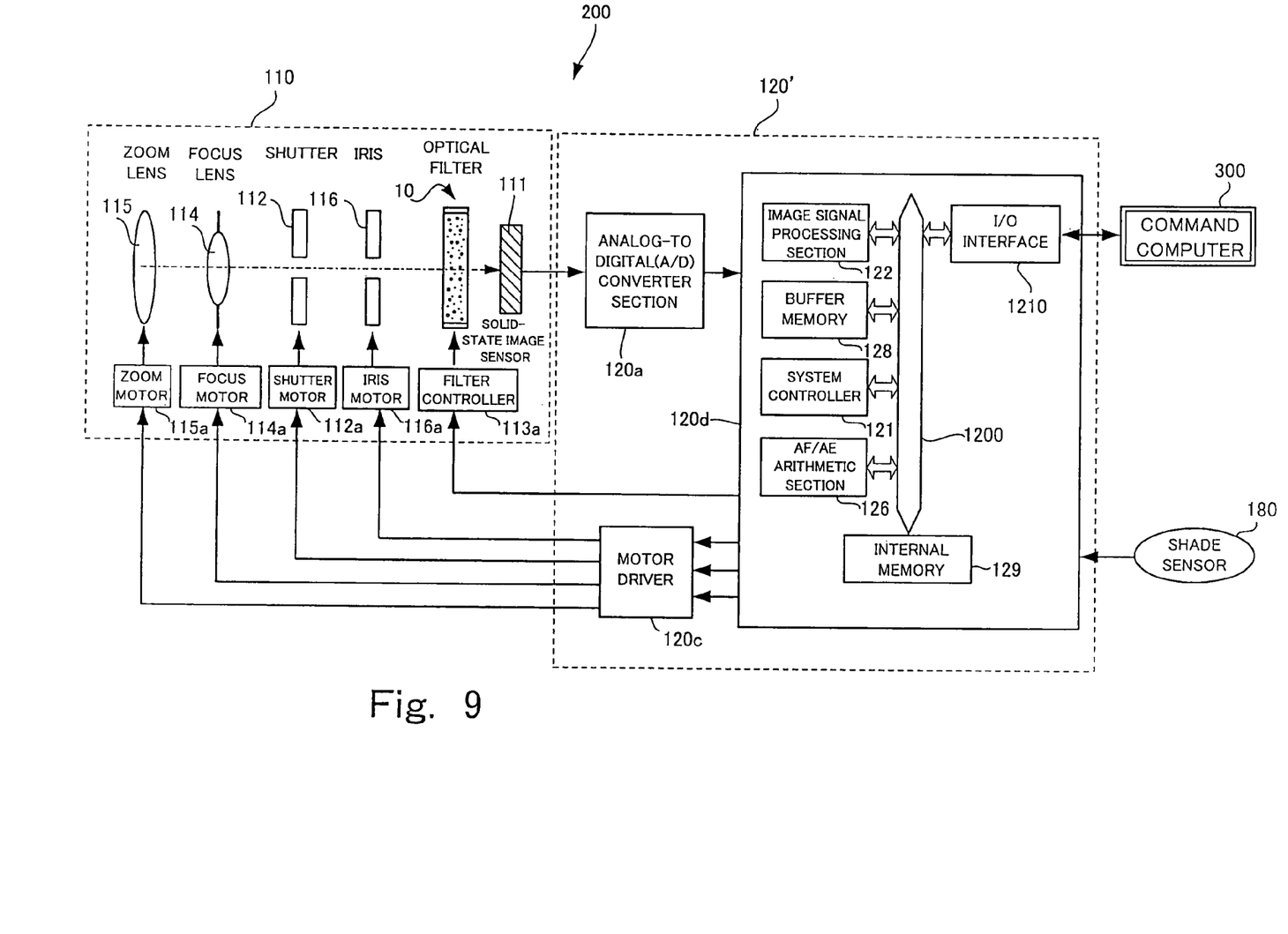
FIG. 9 is a schematic configuration diagram of a surveillance camera.

FIG. 9 is a schematic configuration diagram of a surveillance camera 200.

The configuration of the surveillance camera 200 is almost the same as the digital camera 100 shown in FIG. 6. Thus, like components are denoted by like reference characters and will not be further explained.

While the digital camera is directly manipulated by an operator, the surveillance camera 200 is connected to a higher-level command computer 300 and is manipulated by an operator through the command computer 300. Thus, the surveillance camera 200 does not have switches or an external storage medium manipulated by the operator. A digital signal processing section 120d in a signal processing section 120' also does not have a media controller or a key controller. The digital signal processing section 120d is provided with an I/O interface 1210 for exchanging data or command with the command computer 300. The image data from the surveillance camera 200 is sent through the I/O interface 1210 to the command computer 300 and is used for image display or a record. Thus, the digital signal processing section 120d also does not have an image compression section.

The surveillance camera 200 is provided with a shade sensor 180 for observing the darkness around the surveillance camera. The digital signal processing section 120d sends an instruction based on the observation of the shade sensor 180 to a filter controller 113a, which automatically controls the optical filter 10. That is, when the observation of the shade sensor 180 indicates that the surroundings are darker than a predetermined shade, the optical filter 10 assumes the state shown in FIG. 4 for the night photography. On the other hand, when the observation of the shade sensor 180 indicates that the surroundings are lighter than a predetermined shade, the optical filter 10 assumes the state shown in FIG. 2 for daylight photography.

Thus, in the surveillance camera 200, the night photography and the daylight photography are automatically changed, and thereby excellent automatic photographing can be performed day and night.

Currently available optical filters other than the optical filter 10 in these embodiments will be described below. In the optical filter 10 in the embodiment described in the above, the amount of the transmitted infrared light is changed by the presence of the electric field. Furthermore, in the filter according to the present invention, the amount of the transmitted infrared light may also be changed by the variation of the direction of the electric field. The following are examples of such filters.

Figure 10:
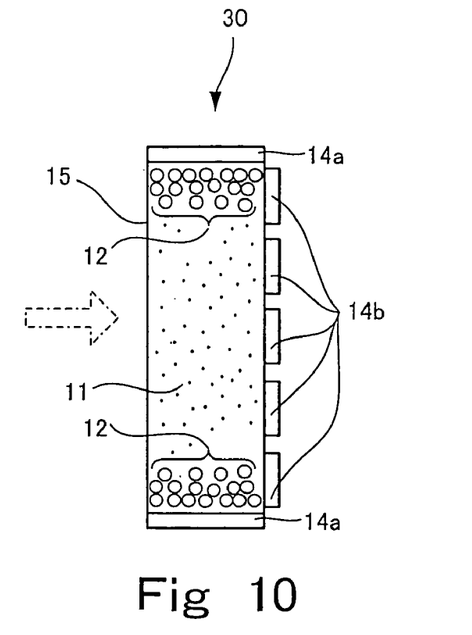
FIG. 10 is a schematic cross-sectional view of another example of the optical filter.

FIG. 10 is a schematic cross-sectional view of another example of the optical filter.

As with the optical filter 10 shown in FIG. 2, an optical filter 30 shown in FIG. 10 is provided with a dispersion medium 11, nanoparticles 12 dispersed in the dispersion medium 11, and a transparent glass container 15 containing the dispersion medium 11 and the nanoparticles 12. However, unlike the optical filter 10 shown in FIG. 2, the optical filter 30 is provided with transparent electrodes 14*b* on a side of the container 15, in addition to electrodes 14*a* on the top end and the bottom end. In FIG. 10, the electrodes 14*a* are negative electrodes and the electrodes 14*b* are positive electrodes. As described above, since the nanoparticles 12 are positively charged, most of the nanoparticles 12 migrate toward the negative electrodes 14*a* and a few nanoparticles 12 absorb light around the center of the container 15, as shown in FIG. 10. Since the optical path of the light from the subject passes through the center of the container 15 as indicated by an alternate long and short dashed line in FIG. 10, the transmittance of the infrared light is large. When the optical filter 30 is installed in a camera, this situation corresponds to the night photography.

Figure 11:
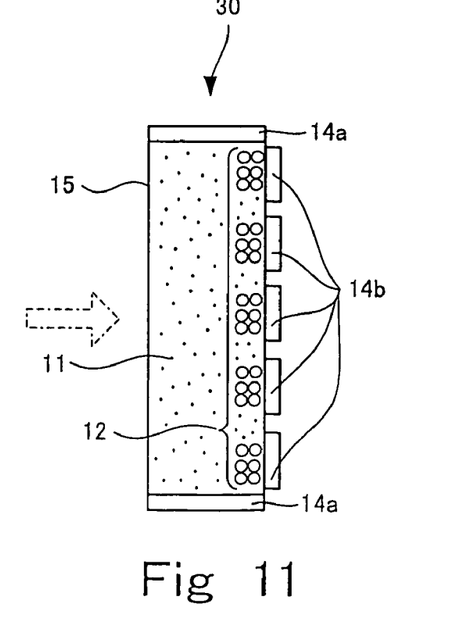
FIG. 11 is a schematic cross-sectional view of the optical filter shown in FIG. 10 when the positive electrodes and the negative electrodes in the optical filter are exchanged.

FIG. 11 is a schematic cross-sectional view of the optical filter 30 shown in FIG. 10 when the positive electrodes and the negative electrodes in the optical filter 30 are exchanged.

In FIG. 11, an electric field is formed in the direction opposite to that in FIG. 10. Thus, most of the positively charged nanoparticles 12 migrate toward the transparent negative electrodes 14*b*, as shown in FIG. 11. Since many nanoparticles 12 absorb light around the center of the container 15, the light transmittance is lower than that in FIG. 10. When the optical filter 30 is installed in a camera, this situation corresponds to the daylight photography.

The filter according to the present invention may be a filter in which the wavelength region of the transmitted light varies with the orientation of the liquid crystal.

Figure 12:
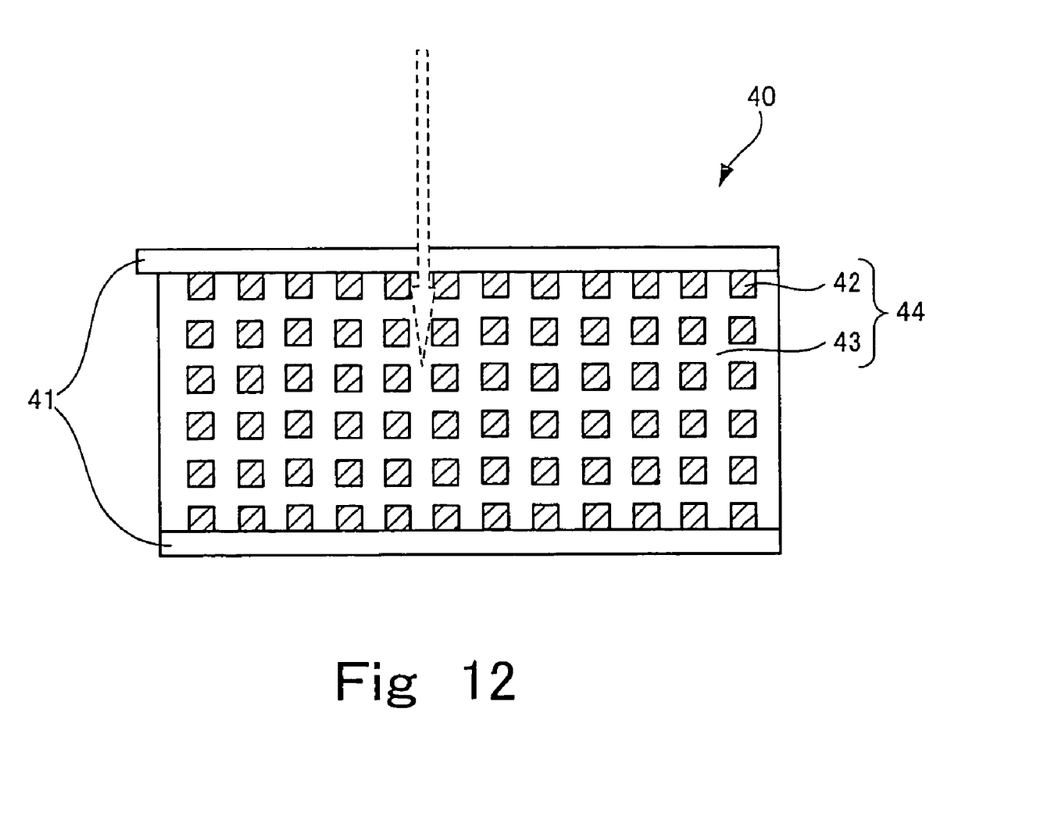
FIG. 12 shows the optical filter using liquid crystals.

FIG. 12 shows an optical filter 40 using a liquid crystal.

The optical filter 40 shown in FIG. 12 includes liquid crystal layers 44 between a top electrode 41 and a bottom electrode 41. The liquid crystal layers 44 include arrays of liquid crystals 42 in a polymer matrix 43.

The liquid crystals 42 are composed of nematic liquid crystals, in which the orientation of the liquid crystal molecules changes with the frequency of an alternating electric field. Such liquid crystal layers 44 at regular intervals are formed by photopolymerizing a mixture of nematic liquid crystals, monomer, and a photopolymerization initiator by a two-beam interference method using an argon laser. The nematic liquid crystals may be two-frequency driving nematic liquid crystal DF02xx (trade name, Chisso Corporation). The monomer may be a mixture of 2-ethylhexyl acrylate and a urethane acrylate oligomer.

When a voltage is applied to the transparent electrodes 41, an electric field is formed at the liquid crystal layers 44. The nematic liquid crystal components of the liquid crystal layers 44 change their orientation with the frequency of the applied voltage. That is, at low frequencies, the major axes of the liquid crystal molecules are parallel to the direction of the electric field. At high frequencies, the major axes of the liquid crystal molecules are perpendicular to the direction of the electric field. The liquid crystal layers 44 are designed such that when the major axes of the liquid crystal molecules of the nematic liquid crystals are parallel to the direction of the electric field under a low-frequency alternating electric field, the refractive index of the liquid crystals 42 in the direction of the electric field is the same as the refractive index of the polymer 43. Since the liquid crystal layer has a uniform refractive index in the direction of the electric field, when light enters parallel to the direction of the electric field, any light in the wavelength region can pass through the optical filter 40. On the other hand, under a high-frequency alternating electric field, the major axes of the liquid crystal molecules generally follow random directions on a plane perpendicular to the electric field. This causes difference between the refractive index of the liquid crystals 42 in the direction of the electric field and the polymer 43. As a result, when light from a subject enters parallel to the electric field, as indicated by a dotted line in FIG. 12, the liquid crystals 42 at the regular intervals cause Bragg reflection, selectively reflecting light having a wavelength corresponding to the regular intervals. In the liquid crystal layers 44, the regular intervals of the liquid crystals 42 (cell gaps) are 25 μm, causing the selective reflection of the light having a wavelength of 800 nm to 900 nm. Under the high-frequency alternating electric field, the light transmittance at a wavelength of 900 nm is 2.0%. Under the low-frequency alternating electric field, the light transmittance at a wavelength of 900 nm is 85%.

The following is another example of the optical filter using a liquid crystal.

Figure 13:
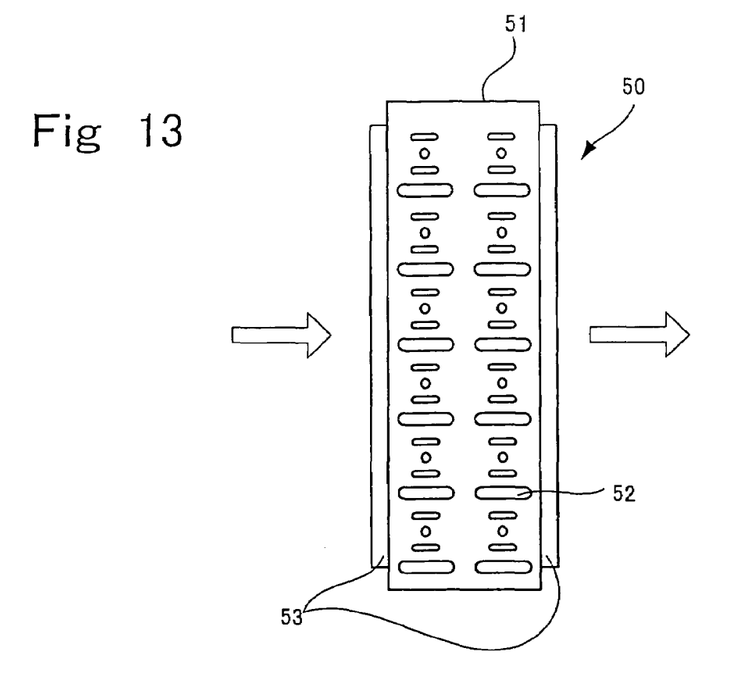
FIG. 13 shows a planer state in another optical filter using a liquid crystal.
Figure 14:
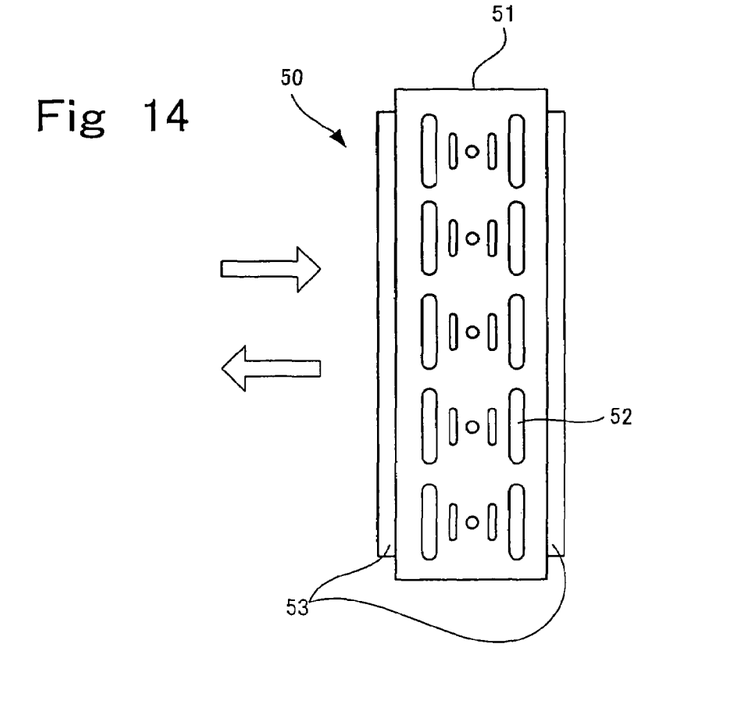
FIG. 14 shows a focal conic state in the optical filter using the liquid crystal.

FIGS. 13 and 14 show another optical filter using a liquid crystal.

An optical filter 50 shown in FIGS. 13 and 14 is provided with a liquid crystal layer 51 containing a spirally oriented liquid crystal 52 between a pair of transparent electrodes 53. The state of the spirally oriented liquid crystal 52 in the liquid crystal layer 51 is designated as a cholesteric state, which is formed by a cholesteric liquid crystal. Alternatively, a mixture of a chiral dopant and a nematic liquid crystal can form the cholesteric state. In this embodiment, the liquid crystal is 5CB (trade name, Merck & Co., Inc.) and the chiral dopant is R-811 and S-811 (trade name, Merck & Co., Inc.).

The cholesteric state in which the screw axis of the liquid crystal 52 is perpendicular to the transparent electrodes 53 as shown in FIG. 13 is designated as a planer state. In the planer state, light having a wavelength corresponding to the helical pitch is selectively reflected. On the other hand, when the screw axis of the liquid crystal 52 is parallel to the transparent electrodes 53 as shown in FIG. 14, this state is designated as a focal conic state. In the focal conic state, the light is not reflected and passes through the optical filter 50.

The reflected light in the planer state has a wavelength corresponding to the helical pitch, which is controlled by the content of the chiral dopant. That is, when the content of the chiral dopant is higher, the helical pitch becomes shorter and light having a shorter wavelength is reflected. In the optical filter 50, the helical pitch is set to be about 10 µm and accordingly infrared light having a wavelength of 800 nm to 1000 nm is selectively reflected. The liquid crystal layer 51 is a laminate of dextrally spiraled liquid crystal layers and sinistrally spiraled liquid crystal layers (details are not shown). The light transmittance of the optical filter 50 is 90% for the focal conic state and 32.0% for the planer state at a wavelength of 900 nm.

The planer state and the focal conic state can be individually formed, for example, by the application of a voltage, as described in Japanese Unexamined Patent Application Publication No. 2001-201762. The planer state or the focal conic state has a "memory"; each state continues until another voltage is applied to compulsorily change the state. Thus, when the optical filter 50 is used in the embodiments described above, the application of voltage is required only when the daylight photography is changed to the night photography, and vice versa. This reduces the power requirements.

While the optical filters in which the amount of transmitted light in the infrared light region varies are explained as the exemplary filters according to the present invention, the filter according to the present invention may be any filter in which the amount of the transmitted light in the ultraviolet light region or the amount of the transmitted light in both the infrared light region and the ultraviolet light region varies.

Up to this point, the embodiments according to the present invention are explained.

Finally, various forms of the components that can be used in the present invention will be described below.

<Nanoparticle>

The nanoparticle may be made of any material, such as silica, alumina, zirconia, titanium oxide, tungsten oxide, zinc oxide, tin oxide, or barium titanate. Titanium oxide, silica gel ($SiO_2$), alumina, or polymer particle is preferred. The nanoparticle may be produced by a solid phase method, a liquid phase method, or a gas phase method, and preferably by the liquid phase method or the gas phase method. Details are found in "Nanoryusi no chousei oyobi bunsan-gyousyu kontororu to sono hyoka (Preparation of nanoparticle, and dispersion-aggregation control and its evaluation), Gijutujou-houkyoukai, 2003". Preferably, the nanoparticle has a size of 100 nm or less. The nanoparticle having a size of more than 100 nm causes a scattering of light, decreasing the transparency (optical transparency).

The nanoparticle itself may absorb the infrared light or the ultraviolet light. If the nanoparticle does not absorb the infrared light or the ultraviolet light, the nanoparticle may contain a material absorbing the infrared light or the ultraviolet light. Examples of the nanoparticle material absorbing the ultraviolet light include titanium oxide. Since silica gel or alumina does not absorb the infrared light or the ultraviolet light, they are preferably mixed with the material absorbing the infrared light or the ultraviolet light. The composite may be prepared by any method. For example, an organic-inorganic hybrid nanoparticle may be prepared by a sol-gel reaction between an organic material absorbing the infrared light or the ultraviolet light and an inorganic material (such as, alkoxytitanium or alkoxysilane) as the main component of the nanoparticle. Alternatively, the material absorbing the infrared light or the ultraviolet light may be immobilized on the surface of the nanoparticle. The absorbent material may be suitably immobilized on the surface of the nanoparticle by introducing an active group on the surface of the nanoparticle either by using a titanate coupling agent, a silane coupling agent, or an aluminum coupling agent, or by graft polymerization, followed by the reaction between the active group and the absorbent material having a reactive group to form a covalent bond.

Examples of the infrared absorbing material include phthalocyanine, naphthalocyanine, anthraquinone, a dithiol metal complex, an aminothiolate metal complex, a phenylenediamine metal complex, aminium, diiminium, a naphthoquinone metal complex, squarylium, cyanine, quinolium, benzothiopyrylium, indolenine, xanthene, and thioxanthen.

Preferably, the surface of the nanoparticle is modified to increase the dispersion stability in the dispersion medium. The surface modification may be performed by using a titanate coupling agent (such as isopropyl triisostearoyl titanate), a silane coupling agent (such as pentadecafluorodecyltrimethylsilane), or an aluminum coupling agent (such as acetoalkoxyaluminum diisopropylate), or by graft polymerization. For the graft polymerization of titanium oxide, polyethylene graft polymerization or polystyrene graft polymerization can be utilized. For the graft polymerization of silica gel, graft polymerization using a silanol group can be utilized. For the polymer particle, a known anionic, cationic, or nonionic surface active agent can be used. Preferably, the anionic surface active agent, for example, sodium laurate, sodium stearate, sodium oleate, sodium dodecyl sulfate, sodium lauryl sulfate, stearyl sodium sulfate, or stearyl sodium phosphate can be used.

Furthermore, an electrifying agent is preferably added to the nanoparticle to appropriately charge the nanoparticle. Examples of the electrifying agent include an amphiphilic (high) molecule, a nigrosine compound, an alkoxylated amine, a quaternary ammonium salt, alkylamide, phosphorus, tungsten, a tungsten compound, a molybdenum chelate pigment, hydrophobic silica, a boron compound, halide, a metal complex salt of a monoazo dye, salicylic acid, alkylsalicylic acid, dialkylsalicylic acid, a metal complex salt of naphthoic acid, chlorinated polyolefin, a chlorinated polyester, a polyester having excessive acid radicals, sulfonylamine of copper phthalocyanine, oil black, a metal salt of naphthenic acid, a metal salt of fatty acid, and a resin soap. The amount of the electrifying agent in the nanoparticle is preferably from 2% by mass to 70% by mass. The electrifying agent may also serve as the absorbent material.

<Dispersion Medium>

The dispersion medium for dispersing the nanoparticles may be water, a nonaqueous organic dispersion medium, or a mixture thereof. Examples of the nonaqueous organic dispersion medium preferably include hydrocarbon (such as hexane, heptane, pentane, octane, or Isopar (brand name, Exxon Mobil Corporation.), a hydrocarbon-based aromatic compound (such as benzene, toluene, xylene, mesitylene, or ethylbenzene), halogenated hydrocarbon (such as difluoropropane, dichloroethane, chloroethane, or bromoethane), a halogenated hydrocarbon-based aromatic compound (such as chlorobenzene), an ether compound (such as dibutyl ether, anisole, or diphenyl ether), an alcohol compound (such as glycerin), a compound having a carbonyl group (such as propylene carbonate), a nitro compound (such as nitromethane), a nitrile compound (such as acetonitrile or benzonitrile), and water.

The dispersion medium does not absorb the light in the infrared light region or in the ultraviolet light region in a manner that depends on the application of the image sensor unit. Preferably, the refractive index, the specific gravity, the viscosity, the resistivity, and/or the permittivity of the dispersion medium is adjusted. This adjustment may be performed for a mixture of multiple dispersion media.

Furthermore, an acid, an alkaline, a salt, a dispersion stabilizer, an antioxidant, a stabilizer for absorbing ultraviolet or the like, an antimicrobial agent, and/or an antiseptic agent may be added to the dispersion medium.

<Container>

As a material of the container that contains the dispersion medium and the dispersoid, a polymer film or plate substrate, such as polyester, polyimide, polymethyl methacrylate, polystyrene, polypropylene, polyethylene, polyamide, nylon, polyvinyl chloride, polyvinylidene chloride, polycarbonate, polyethersulfone, a silicone resin, a polyacetal resin, a fluorocarbon resin, a cellulose derivative, or polyolefin; or an inorganic substrate, such as a glass substrate, a metal substrate, or a ceramic substrate is suitably used. The container preferably has a light transmittance of at least 50% and more preferably at least 80%.

<Electrode>

The negative electrode or the positive electrode may be suitably composed of gold, silver, copper, aluminum, magnesium, nickel, platinum, carbon, an electrically conductive polymer, and/or a metal oxide layer, such as indium tin oxide (ITO), tin oxide, or zinc oxide. When the electrode is placed in the light path, a transparent electrode is preferred. The transparent electrode is preferably a metal oxide, such as indium tin oxide (ITO), tin oxide, or zinc oxide.

The basic embodiments that implement the concept of the present invention have been described above. In the practical use of the optical element employed in the present invention, some means should be employed to prevent adhesion of contaminants or water droplets which deteriorates the performance of the lens.

For example, the external surface of the container containing the liquid perpendicular to the optical path (hereinafter referred to as "light-transmitting surface") is preferably provided with a water-repellent film. The water repellent light-transmitting surface prevents the contaminants or water droplets from adhering to the optical path, maintaining high optical transparency of the optical element. Preferably, a material for the water-repellent film may be a silicone resin, an organopolysiloxane block copolymer, a fluorinated polymer, or polytetrafluoroethane.

The light-transmitting surface of the container constituting the optical element is preferably applied with a hydrophilic film. The hydrophilic/lipophobic light-transmitting surface may also prevent the adhesion of the contaminants. Preferably, the hydrophilic film may be composed of an acrylate polymer or may be coated with a surface active agent, such as a nonionic organosilicone surface active agent. The hydrophilic film may be prepared by the plasma polymerization of a silane monomer or by ion beam treatment.

The light-transmitting surface of the container constituting the optical element is also preferably applied with a photocatalyst, such as titanium oxide. Contaminants are photolyzed by the action of the photocatalyst, and thereby the light-transmitting surface is kept clean.

The light-transmitting surface of the container constituting the optical element is also preferably applied with an antistatic film. The electrostatic buildup on the light-transmitting surface of the container or an electrically charged light-transmitting surface caused by the electrodes may cause the adhesion of contaminants on the light-transmitting surface. The antistatic film on the light-transmitting surface can prevent the adhesion of contaminants, maintaining the optical transparency of the optical element. The antistatic film is preferably composed of a polymer alloy. In particular, the antistatic film is preferably composed of a polyether alloy, a polyether esteramide alloy, an alloy having a cationic group, or Reolex (trade name, Dai-ichi Kogyo Seiyaku Co., Ltd.). Preferably, the antistatic film is prepared by a mist method.

The container constituting the optical element may be applied with an antifouling material. Preferably, the antifouling material is a fluorocarbon resin. Specifically, a fluorine-containing alkylalkoxysilane compound and a polymer or oligomer having a fluorine-containing alkyl group are preferred. In particular, those having a functional group crosslinkable with the curable resin are preferred. Preferably, the amount of the antifouling material is a minimal amount that achieves antifouling property.

What is claimed is:

1. A image taking apparatus that receives light from a subject and generates an image signal, comprising:
   (A) an image sensor unit including:
      (a) an image sensor that receives the light from the subject and generates the image signal, and
      (b) a filter that is disposed in front of the image sensor, having:
         (b-1) a transparent layer that is transparent to light in a visible light region regardless of the state of an electric field and is transparent to light in a predetermined variable transparent region containing an infrared light region and/or an ultraviolet light region in response to the state of the electric field, and
         (b-2) electrodes that generate the electric field in the transparent layer on the application of a voltage; and
   (B) a filter controller that regulates the wavelength region of light passing through the filter by controlling the voltage applied to the electrodes; and
   wherein the transparent layer is composed of a dispersion medium that is transparent to the light in the visible light region and the variable transparent region, and dispersoids that are dispersed in the dispersion medium, the dispersoids being impermeable to the light in the variable transparent region and transparent to the light in the visible light region.

2. The image taking apparatus according to claim 1, further comprising:
   a sensor that determines the brightness of the subject,
   wherein the filter controller applies a voltage depending on a measurement obtained with the sensor.

3. The image taking apparatus of claim 1, further comprising:
   a mechanical iris on an incident light side of said filter.

4. The image sensor unit according to claim 1, wherein the dispersoids are nanoparticles containing infrared absorbing material.

5. The image sensor unit according to claim 1, wherein the dispersoids are polymer particles containing infrared absorbing material.

6. The image sensor unit according to claim 1, wherein the dispersion medium is an organic dispersion medium.

7. The image sensor unit according to claim 1, wherein the dispersion medium is a hydrocarbon-based organic dispersion medium.

8. An image taking apparatus that receives light from a subject and generates an image signal, comprising:
   (A) an image sensor unit including:
      (a) an image sensor that receives the light from the subject and generates the image signal, and
      (b) a filter that is disposed in front of the image sensor, having:

(b-1) a transparent layer that is transparent to light in a visible light region regardless of the state of an electric field and is transparent to light in a predetermined variable transparent region containing an infrared light region and/or an ultraviolet light region in response to the state of the electric field, and (b-2) electrodes that generate the electric field in the transparent layer on the application of a voltage; and (B) a filter controller that regulates the wavelength region of light passing through the filter by controlling the voltage applied to the electrodes, and wherein the transparent layer is a liquid crystal layer in which the orientation of liquid crystal molecules varies in response to the state of the electric field, and the liquid crystal layer changes between an off-state, in which the light in the visible light region and the variable transparent region passes through the liquid crystal layer, and an on-state, in which only the light in the variable transparent region is absorbed or reflected and the light in the visible light region passes through the liquid crystal layer, in a manner that depends on the orientation of the liquid crystal molecules.

9. The image sensor unit according to claim 8, wherein the transparent layer is a holographic liquid crystal layer.

10. The image sensor unit according to claim 8, wherein the transparent layer is a cholesteric liquid crystal layer.

* * * * *